United States Patent Office 3,378,547
Patented Apr. 16, 1968

3,378,547
CATIONIC STARCH
Chim P. Patel, Granite City, Ill., Mark A. Jaeger, Lemay, Mo., and Ronald E. Pyle, Granite City, Ill., assignors to Union Starch & Refining Co., Inc., Columbus, Ind., a corporation of Indiana
No Drawing. Filed Aug. 4, 1966, Ser. No. 570,182
6 Claims. (Cl. 260—233.3)

This invention relates to a cationic starch product and process of making the same.

One of the most important industrial uses of starch is an internal additive and/or surface size in the manufacture of paper. Ordinary unmodified starches, i.e., uncooked pearl or cooked pearl starch dispersions, are anionic in nature and when used as an internal additive in paper, they are retained primarily by the filtration effect of the wet web. Cationic starches, i.e. starches which have been modified so that they have a positive electrostatic charge, exhaust directly on the negative cellulose fibers used for paper manufacture and are not affected by the porosity of the wet paper web. Their retention is higher, therefore, and their effectiveness is greater than that obtained with unmodified starches. In addition, they produce effects not obtainable with ordinary unmodified starches.

Methods of producing cationic starch ethers, in the original ungelatinized, granular starch form, have been disclosed in patents issued to Caldwell et al., No. 2,813,-093; Paschall, No. 2,876,217; and Hullinger et al., No. 2,970,140. Caldwell et al. and Hullinger et al. have obtained starch ethers in which the substituent radicals contained tertiary amino groups. The etherifying agents of Caldwell et al. were alkyl epoxides and alkyl halides containing tertiary amino groups. Paschall treated starch with the purified reaction product of an epihalohydrin and a tertiary amine or amine salts, essentially alkyl epoxides, to provide starch ethers containing a quaternary ammonium group.

Among the objects of the present invention is to provide an improved type of cationic starch and process for making the same.

Among other objects of the invention is to provide a starch ether in which the ether group contains a quaternary ammonium group and a process for making the same.

The objects of the invention are attained by reacting the starch-alkali complex in granular form while suspended in an aqueous medium with 4-halo-2-butenyl trimethyl ammonium halide. This class of compounds, essentially substituted allyl halides, is particularly useful for this reaction because of its highly reactive nature. High reactivity of allyl halides results from the peculiar position of the double bond with respect to halogen. A positively charged carbonium ion, which is formed by spontaneous removal of halogen, is stabilized by resonance with the double bond. This stabilized carbonium ion reacts rapidly with the granular starch-alkali complex to form a starch ether. In this case, the starch ether contains a quaternary ammonium group. The reaction may be illustrated by the following equations.

1.

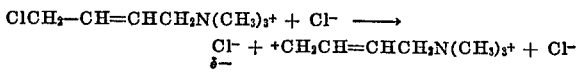

2.

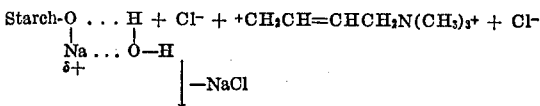

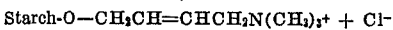

For optimum reaction the aqueous reacting medium should be highly alkaline containing about 2–4% NaOH or an equivalent amount of potassium or ammonium hydroxides (on the basis of the starch) and a gelatinization inhibitor such as sodium chloride or sodium sulfate should be present to prevent damage to the starch granules. About 15–50% of the inhibitor (on the basis of the starch) is required.

The proportion of starch to the aqueous medium is not very critical but for practical purposes the suspension should contain about 30 to 40% by weight of starch.

The reaction can be carried out at temperatures of about 80 to 120° F. The reaction rate increases with the temperature but temperatures which produce gelantinization of the starch should be avoided.

The proportion of the 4-halo-2-butenyl-trimethyl ammonium halide to starch should be from about .05 to 4 mol percent based on the $C_6H_{10}O_5$ starch unit.

The following examples are given to illustrate in detail how the process is carried out. It is to be understood that the specific details given in the examples are not to be considered as limiting the scope of the invention.

EXAMPLE 1

1000 grams (dry basis) corn starch were suspended in 1400 ml. water. A solution of 40 grams sodium hydroxide and 500 grams sodium sulfate in 1400 ml. water was added. The slurry was warmed to 110° F. and 40 grams 4-chloro-2-butenyl-trimethyl ammonium chloride were added. The reaction was allowed to proceed 18 hours and then neutralized to pH 4 with hydrochloric acid, filtered, washed, and dried.

EXAMPLE 2

1000 grams (dry basis) corn starch were suspended in 1400 ml. water. A solution of 25 grams sodium hydroxide and 250 grams sodium sulfate in 1000 ml. water was added. The slurry was warmed to 110° F., and 40 grams 4-chloro-2-butenyl trimethyl ammonium chloride were added. The reaction was allowed to proceed 18 hours and then neutralized to pH 4 with hydrochloric acid, filtered, washed and dried.

The starches resulting from Examples 1 and 2 were found to be in their original granular form. They dispersed readily in water, and when pasted by a standard method using the Corn Industries Research Viscometer, which is a well-known procedure in the wet milling industry; the gelatinization temperature of the treated starch was found to be much lower than that of the untreated starch, as shown in Table I. Peak viscosities of the treated starch pastes were considerably higher than those of the untreated starch pastes; the treated starch pastes were clearer than the untreated control, and showed less tendency to gel upon standing. These results are summarized in Table I.

TABLE I.—PROPERTIES OF NEW CATIONIC STARCH AS DETERMINED WITH CORN INDUSTRIES RESEARCH VISCOMETER

|  | Control | Treated [1] | Treated [2] |
|---|---|---|---|
| Slurry Solids (percent) | 5.0 | 5.0 | 5.0 |
| Gelatinization Temp., ° C | 85 | 66 | 67 |
| Maximum Viscosity, gm.-cm | 130 | 1,510 | 1,680 |
| 30 Minute Viscosity, gm.-cm | 110 | 550 | 550 |

[1] 4% excess caustic used; Example 1.
[2] 2½% excess caustic used; Example 2.

Cationic efficiency was measured using the procedure described by Mehltretter et al. in the paper entitled "Spectrophotometric Method for Determining Cationic Efficiency of Pulp-Cationic Starch Complexes." [1] Using the tech- ---
[1] Meltretter et al., Tappi, vol. 46, No. 8, August 1963.

nique described in this paper, cooked starch pastes were added to wood pulp fiber dispersions to which had been added previously 2.0% pigment (on the weight of the dry pulp) containing an anionic dispersant. The resulting fiber-pigment-starch dispersions were filtered, and the amount of pigment retained by the pulp was determined. In the absence of starch, pigment retention by the pulp averaged less than two percent of the pigment added. Using 0.05, 1.25 and 2.50 percent modified starch on the basis of the pulp, pigment retention on basis of pigment added was found to be 68 percent, 98 percent and 88 percent, respectively, for Example 1, and 36 percent, 100 percent, and 99 percent, respectively, for Example 2, as shown in Table II. A highly successful commercial cationic starch retained 24 percent, 97 percent, and 56 percent of the pigment added, showing a generally lower and a more variable retention.

TABLE II.—EFFECT OF NEW CATIONIC STARCH ON PIGMENT RETENTION IN PAPER MADE FROM WOOD PULP FIBER DISPERSIONS

| Amount of Starch Added, percent | 0.05 | 1.25 | 2.50 |
|---|---|---|---|
| Pigment Retention, percent: | | | |
| Unmodified Pearl Corn | 0 | 1 | 12 |
| Treated Corn Starch [1] | 68 | 98 | 88 |
| Do.[2] | 36 | 100 | 99 |
| Commercial Cationic Starch | 24 | 97 | 56 |

[1] 4% excess caustic used; Example 1.
[2] 2½% excess caustic used; Example 2.

The features and principles underlying the invention described above in connection with specific exemplifications will suggest to those skilled in the art many other modifications thereof. It is accordingly desired that the appended claims shall not be limited to any specific feature or details thereof.

We claim:

1. Process for preparing cationic starch comprising reacting starch suspended in as aqueous medium with 4-halo-2-butenyl-trimethyl ammonium halide in the presence of an alkali.
2. The process as claimed in claim 1 wherein the starch is reacted with 4-chloro-2-butenyl trimethyl ammonium chloride.
3. The process as claimed in claim 1 wherein the aqueous medium is heated to 80 to 120° F.
4. The process as claimed in claim 4 wherein a gelatinization inhibitor is added to the aqueous suspension of the starch.
5. The process as claimed in claim 4 wherein 15 to 50% of a gelatinization inhibitor is added on the basis of the starch weight, the gelatinization inhibitor being selected from the group consisting of sodium sulfate and sodium chloride.
6. A cationic starch consisting essentially of the reaction product of starch suspended in an aqueous medium with 0.5 to 4.0 mol percent, based on the $C_6H_{10}O_5$ starch unit, of 4-halo-2-butenyltrimethyl ammonium chloride.

References Cited

UNITED STATES PATENTS 3,346,563   10/1967   Shildneck et al. ____ 260—233.3
3,152,925   10/1964   Patel et al. _____ 127—33

OTHER REFERENCES

Whistler and Paschall, Starch Chemistry and Technology, vol. 1, pp. 465–466, Academic Press, New York, N.Y., 1965 (TP 415 W4).

DONALD E. CZAJA, Primary Examiner.

R. W. MULCAHY, Assistant Examiner.

Disclaimer 3,378,547.—*Chim P. Patel*, Granite City, Ill., *Mark A. Jaeger*, Lemay, Mo., and *Ronald E. Pyle*, Granite City, Ill. CATIONIC STARCH. Patent dated Apr. 16, 1968. Disclaimer filed Feb. 18, 1969, by the assignee, *Union Starch & Refining Co., Inc.*

Hereby enters this disclaimer to claims 1–6 inclusive of said patent.

[*Official Gazette April 1, 1969.*]